Dec. 19, 1950  L. P. FRIEDER ET AL  2,534,704
RELEASE APPARATUS FOR LOAD SUPPORTS
Filed June 28, 1947  3 Sheets-Sheet 2
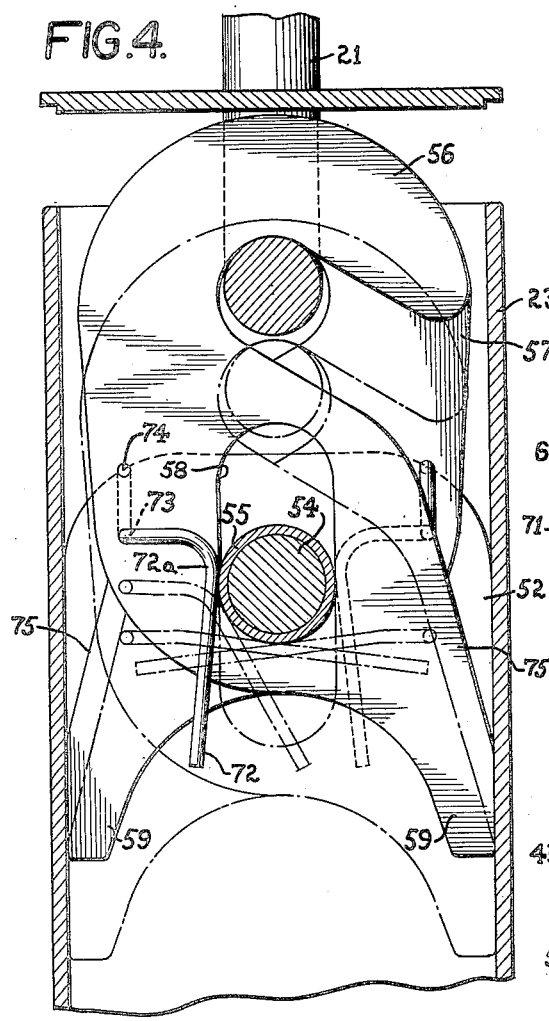
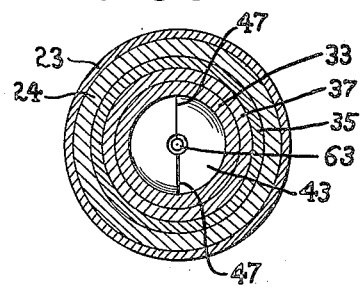
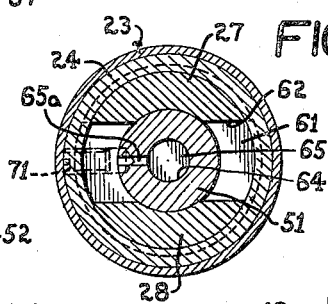
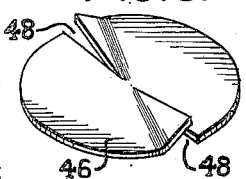
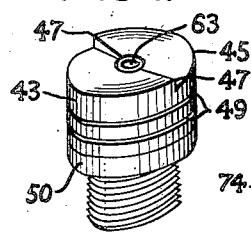
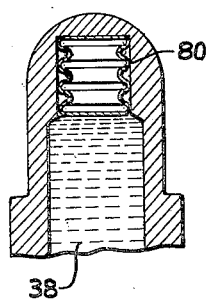
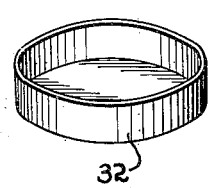
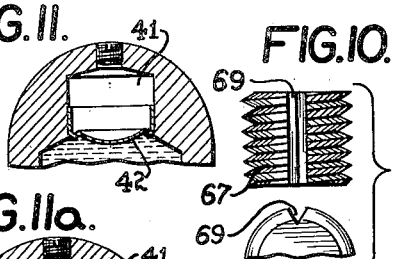
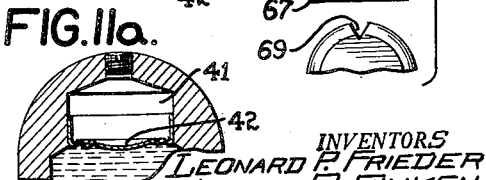
INVENTORS
LEONARD P. FRIEDER
WALTER S. FINKEN
BY Robert S. Dunham
ATTORNEY Dec. 19, 1950   L. P. FRIEDER ET AL   2,534,704
RELEASE APPARATUS FOR LOAD SUPPORTS
Filed June 28, 1947                         3 Sheets-Sheet 3
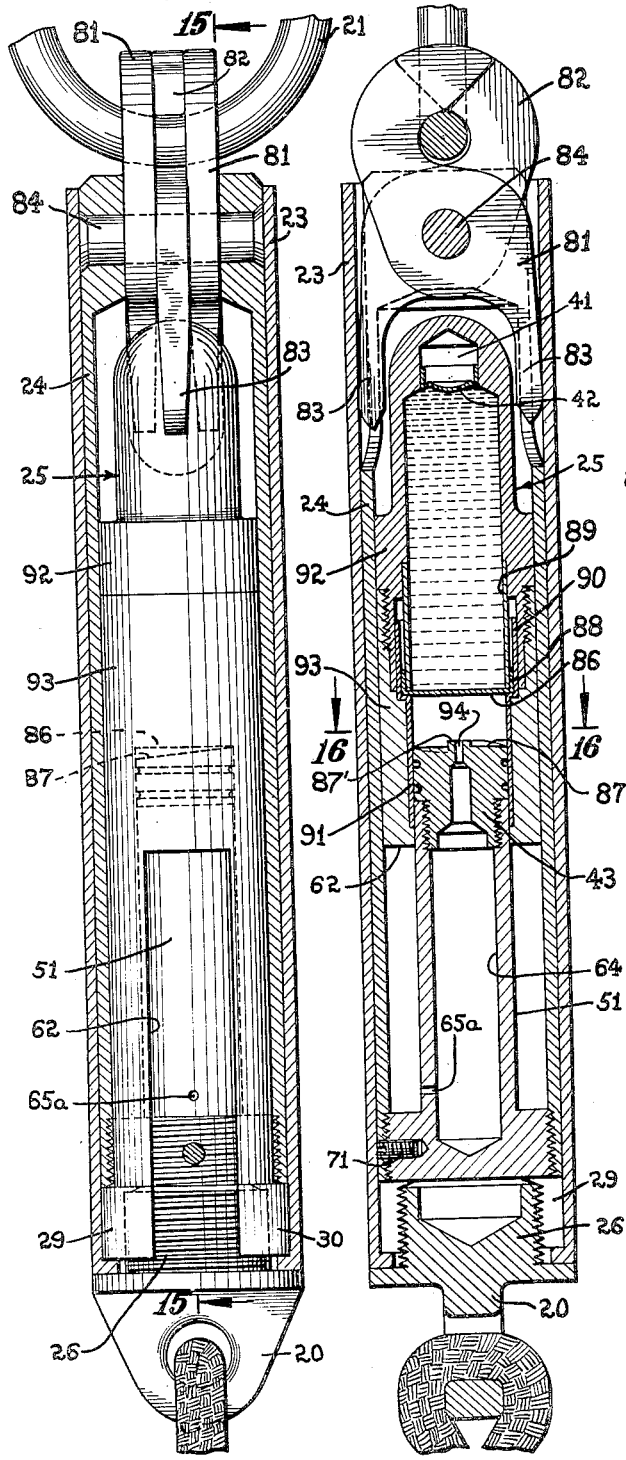
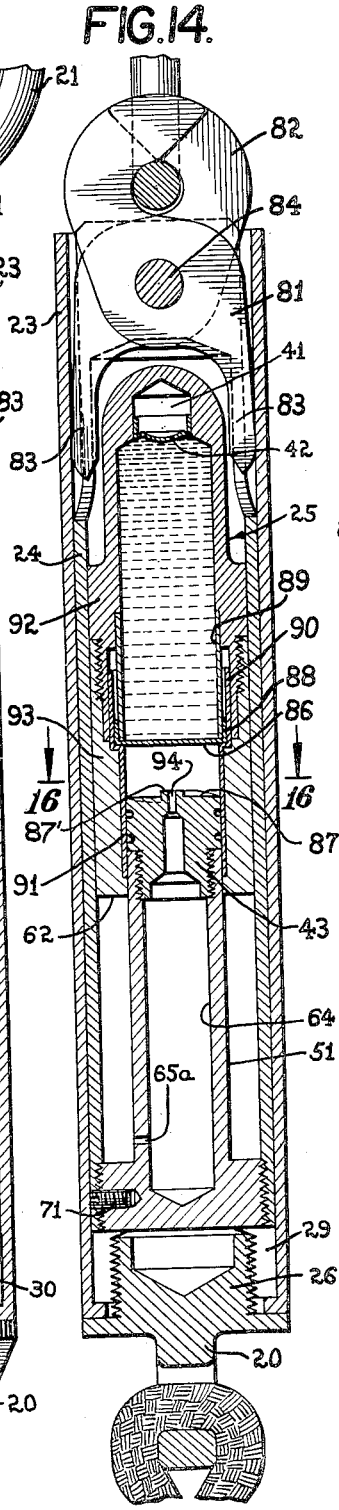
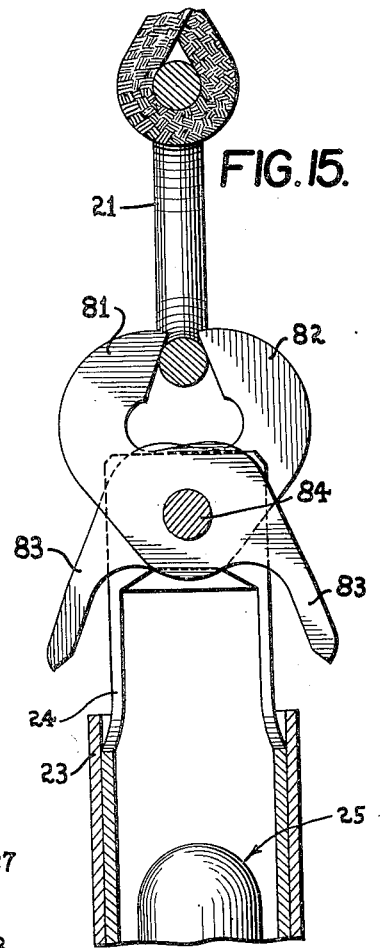
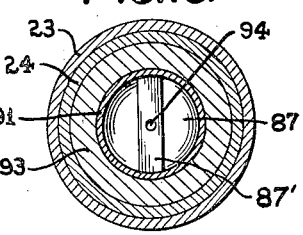
INVENTORS
LEONARD P. FRIEDER
WALTER S. FINKEN
BY Robert S. Dunham
ATTORNEY Patented Dec. 19, 1950

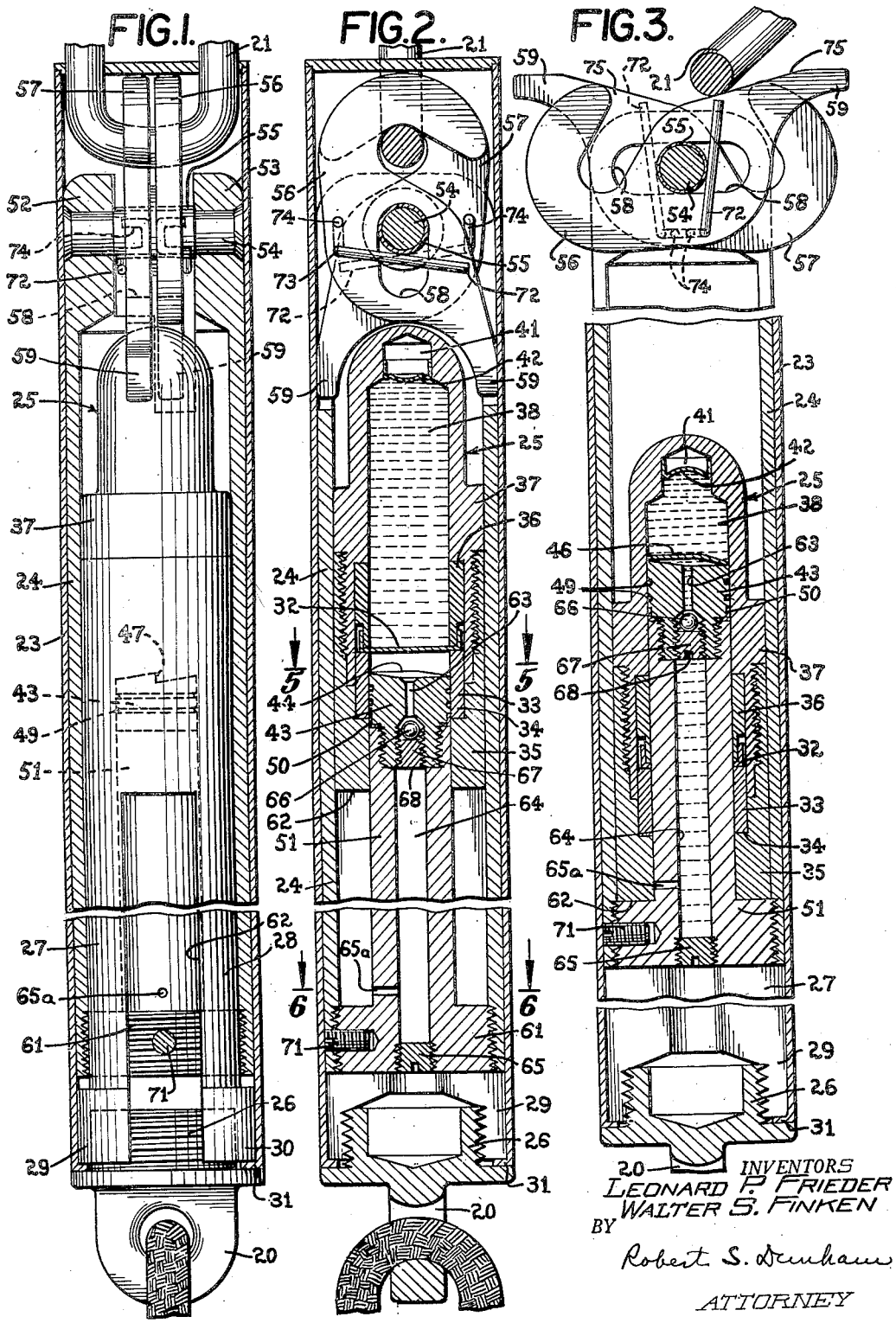

2,534,704

UNITED STATES PATENT OFFICE 2,534,704

RELEASE APPARATUS FOR LOAD SUPPORTS

Leonard P. Frieder, Great Neck, and Walter S. Finken, Brooklyn, N. Y.; said Finken assignor to said Frieder Application June 28, 1947, Serial No. 757,798

15 Claims. (Cl. 294—83)

This invention relates generally to the use of parachutes and like supports in controlling the descent of loads of various kinds and has particular reference to improvements in release mechanism for connecting the parachute (or other suspending instrumentality) and the load and for automatically disconnecting the two, e. g. when the parachute has served the intended purpose.

The main object of the invention is to provide an improved release mechanism which is simple in construction and which may, if desired, be so set or adjusted as to disconnect the load upon the happening of a predetermined event, for instance when the load strikes the ground.

The improved mechanism is also useful in controlling the descent of the load until it has been supported for a predetermined length of time, and then freeing the load from further restraint by the parachute or the like.

It may also be used to disconnect a parachute from the load at or soon after the time when, for example, a separately connected, larger parachute is called into play to take up the load in operations where parachutes of different sizes are used one after the other to gradually retard descent of the load to a desired final landing speed.

The device includes what may be termed a hydraulic dash pot for controlling the disconnection. Owing to the circumstances of use it is highly desirable that there be no leakage of the hydraulic fluid from the device and another of the objects is to provide a construction in which the fluid is sealed in the cylinder of the dash pot until the parachute actually assumes support of the load. The construction is such that the strain or shock imposed by the opening of the parachute will cause a die on the dash pot piston to shear a diaphragm so that the hydraulic fluid may then perform its function in controlling the further movement of the piston. This piston movement in turn controls the parts which serve, at a later time or immediately, to connect and disconnect the parachute and the load.

The hydraulic fluids employed are usually oils and an adjustment is provided which may be set according to the viscosity of the oil as well as to regulate the flow of the oil when the dash pot is operated.

Hydraulic fluids, including the oils mentioned, are usually susceptible to expansion and contraction, and another object of the invention is to provide means for accommodating such changes in volume of the fluid to prevent premature rupture of the seal which normally holds the fluid in the dash pot cylinder.

In one form of the invention springs are employed to open hooks which are used to connect the device and load to the parachute. Springs which are kept under tension for any great length of time tend to lose their resilience and another object of the invention is to provide a construction in which the springs are not tensioned until just before they are released to perform their function, i. e. until the load has begun its descent toward the ground, where the hooks are to release.

With the foregoing and other more or less incidental objects in view the invention consists of a novel construction and relative arrangement of parts as hereinafter described with references to respective embodiments shown in the drawings accompanying and forming a part of this specification, the novel features of the invention being pointed out in the claims appended hereto.

In said drawings:

Fig. 1 is a side view of a device according to the invention with the outside casing and some of the adjacent parts cut away or omitted to expose other parts to view;

Fig. 2 is a longitudinal section through the device (viewed from the left of Fig. 1) showing the parts in the positions they occupy after the device has been connected to a parachute and before the parachute opens;

Fig. 3 is a section on the same plan as Fig. 2, but shows the positions of the parts after the device has performed its function and has released the parachute on striking the ground;

Fig. 4 shows more or less diagrammatically the successive steps in tensioning the springs which serve to open the hooks by which the device, and its load, were suspended in the air;

Fig. 5 is a section along the line 5—5 of Fig 2;

Fig. 6 is a section along the line 6—6 of Fig. 2;

Fig. 7 is a detail of the hydraulic piston head employed and the construction of its upper face to provide a shearing die;

Fig. 7a is a detail of the sealing diaphragm;

Fig. 8 is a detail of the disc which is sheared out of the sealing diaphragm by the shearing die of Fig. 7;

Fig. 9 is a detail showing the formation or configuration of one of the release hook operating springs;

Fig. 10 shows on an enlarged scale the vent in the adjusting screw at the head of the dash pot piston;

Fig. 11 is a detail on an enlarged scale of one form of means provided for accommodating heat expansion of the hydraulic fluid;

Fig. 11a is a detail of the expansion arrangement used in some embodiments of the invention;

Fig. 12 is a detail of another form of construction for accommodating expansion and contraction of the hydraulic fluid;

Figs. 13, 14 and 15 are views corresponding to Figs. 1, 2 and 3, but illustrating modifications of the invention; and Fig. 16 is a section on line 16—16 of Fig. 14.

The embodiments of the invention shown in the drawings are preferably substantially cylindrical and comprise an ear 20 at the lower end to which the load may be connected in any suitable way, and hooks at the upper end which are operable to connect and disconnect the device from a load ring 21 or corresponding connection to a parachute, balloon or other aircraft. When the parachute opens to support the load or when a pull is otherwise exerted relative to the ring, the strain imposed will tend to cause a relative movement of the ear 20 and load ring 21 which is employed to operate the device as hereinafter described to permit ultimate release of the parachute, e. g. when the load reaches the ground.

The device has a casing 23 surrounding a slidable member 24 and a dash pot cylinder 25. The dash pot cylinder is composed of several parts as hereinafter explained but for present purposes it may be considered as a unit which is bifurcated as at 27 and 28 (Fig. 1) at its lower end, and held stationary with respect to the casing 23 by a threaded plug 26, integral with the ear 20, engaging threads on the interiors of portions 29 and 30 which are integral with the bifurcated sections 27 and 28. The outer casing 23 has an inturned flange 31 which is clamped between the upper surface of ear 20 and the lower ends of the portions 29 and 30. The dash pot cylinder 25 and the external casing 23 are, therefore, firmly held against relative movement.

The dash pot cylinder is composed of several parts mainly because of the necessity for holding an oil seal in place. This seal is in the form of a thin metallic diaphragm 32 (Fig. 2) seated on a bushing 33 which is supported by a shoulder 34 on the interior of one of the parts 35 of the hydraulic cylinder. Above the bushing 33 is another bushing 36 which is cut away to receive an upturned flange of the diaphragm 32. The diaphragm 32 is thus preferably cup-shaped as shown in Fig. 7a, the upturned flanges being of peculiar advantage, for example in affording rigidity for the edge of the diaphragm in close proximity to the region of shear by the die means described below, and also in holding the diaphragm firmly in concentric position relative to the shear wall of the bushing 36, i. e. the cylindrical wall with which the die means cooperates in such shearing action. The cup-shaped diaphragm avoids any tendency, which a simple disc might have, of pulling free in its entirety from the clamping bushings and then scoring the inner surface of the cylinder so as to provide unwanted channels for leakage of fluid past the piston (described below) on the upward thrust.

The part 35 of the dash pot cylinder is internally threaded at its upper end to engage corresponding threads on a member 37 whereby when the parts 35 and 37 are screwed together the diaphragm 32 will be firmly held in place between the bushings 33 and 36. It will be noted that the upturned flange of the diaphragm fits over the externally reduced portion of the bushing 36 and the lower edge of the latter forces the peripheral portion of the diaphragm disc against the upper edge of the bushing 33 upon the described tightening of the part 35 relative to the part 37, which is the upper section of the dash pot cylinder and has a portion extending downwardly around the bushings, as shown, to receive the part 35. In this way the diaphragm is secured rigidly at its edge, in the desired concentric relation to the bushings.

The interior 38 of the dash pot cylinder is filled with oil or any other desired fluid and is held against leakage by the diaphragm 32 until the diaphragm is sheared or ruptured.

As hereinabove stated, the hydraulic fluid is subject to expansion by heat and in order to prevent accidental rupture of the diaphragm 32 by such expansion means are provided to accommodate the expansion without straining the diaphragm. In one embodiment the top of central cavity 38 of the dash pot cylinder has an extension 41 which is normally kept free of the fluid by a cap 42 which has a close sliding fit in the extension 41. The head of the cap 42 may yield sufficiently to accommodate minor expansions of the hydraulic fluid although major expansions of the fluid may shift the cap 42 from the position in which it is shown in Fig. 2 to the position in which it is shown in Fig. 3. In order to facilitate yielding of the cross portion of the cap 42 the material may be bent somewhat as shown in Figs. 2, 11 or 11a so that it will function under pressure somewhat in the manner of the spring bottoms used in oil cans. The important thing is to provide for enough yield or give to prevent imposing damaging strains on the diaphragm 32. Although in some cases a limited degree of compensation may be obtained by providing concentric corrugations in the diaphragm 32 so that the latter constitutes an expansion device itself, it is at present preferred to provide a considerably greater expansion as by means of the structure including the recess or well 41.

The oil is held by the diaphragm 32 against escape until the diaphragm 32 is sheared or severed by a piston head 43 which has its upper surface constructed to form a shearing die 44. The perimeter or edge 45 (see Fig. 7) of the die cooperates with the bushing 36 to shear out the diaphragm in such a way as to produce a loose disc 46, Fig. 8, when the dash pot piston is thrust upward. To facilitate the shearing action the surface of the die is composed of two oppositely inclined sections which provide corners or points 47 (Fig. 7) which penetrate the diaphragm material and thereby give an efficient start to the shearing operation. In addition, the edges of the two sections shear or tear the diaphragm crosswise and deform the material sufficiently to leave clearances 48 through which the fluid may escape as the disc 46 is carried upward by the piston head. To prevent the escape of fluid around the head 43, that head is provided with circumferential grooves 49 (Fig. 7) which act as liquid stops, and a cup gasket 50 has its upturned flange seated in a cut away portion of the head 43. The web of the gasket is clamped between the head and piston member 51.

The lower end of head 43 is threaded into the upper end of the piston member 51 which is actuated as hereinafter described upon upward movement of the load ring 21 relative to the ear 20. This actuation is effected by the sliding member 24 (Fig. 2) which is constructed at its upper end to provide two supports 52 and 53 for a pin 54 which carries a sleeve 55 serving as a spacer for the members 52 and 53 when the pin 54 has its ends headed or flanged to secure the pin in place.

Journaled on the pin 54 and sleeve 55 are two hooks 56 and 57 for engaging a load ring 21 connected to a supporting aircraft, for example a parachute. Each of these hooks is provided with a vertical slot 58 surrounding pin 54 and sleeve 55. Integral with each of the hooks is an arm or extension 59 which cooperates with the interior of casing 23 to hold the hooks 56 and 57 in engagement with the load ring 21 until the hooks are moved out far enough for arms 59 to clear the upper end of the casing, whereupon springs hereinafter described will throw the hooks apart to disengage them from load ring 21, when the weight of the attached load is relieved. (This feature permits the load to remain attached and held securely to a buoyed body, parachute or the like, while in flight and discharges the attached load only after the attached load lands.) Outward movement of the hooks is transmitted through the sliding tubular member 24 to the piston 51 by threads on the interior of the member engaging threads on a cross-head 61 integral with the piston member 51. The cross-head extends through the slot 62 between the members 27 and 28, the sides of the slot and the cross-head cooperating to guide the piston in its up and down movement. It is apparent that when the load shock causes the relative movement above mentioned the piston member 51 and its head 43 are forced upward relative to the dash pot cylinder 37 and the shearing die 44 will thereupon cut the diaphragm 32 to free the fluid in the compartment 38. As the piston continues its upward movement the fluid escapes through a passage 63 into a central bore or well 64 in the piston closed at its bottom by a screw plug 65. The fluid escapes through vent 65a into a reservoir comprising the annular space between piston 51 and tube 24. Thus none of the fluid escapes to the atmosphere.

The flow of the fluid through the vent or passage 63 in the piston head is controlled by a valve consisting of a ball 66 and adjusting screw 67 (Fig. 10) threaded into the cavity containing the ball. This screw is slotted as at 68 for adjustment by a screw driver to regulate the gap or space between the surface of the ball and the lower end of the passage 63 to control the rate of flow of the fluid and upward movement of the piston 51 and, consequently, the time when the hooks 56 and 57 will have been carried out far enough for their arms 59 to escape from the confines of the casing 23.

In order to allow the fluid to get by the adjusting screw 67, the side of the screw is slotted longitudinally across the threads as shown at 69, Fig. 10, it being, of course, desirable to have these slots deep enough and in sufficient number to accommodate a maximum fluid flow if the valve 66, 67 should be substantially wide open.

As previously stated, the sliding member 24 is connected to the piston 51 by threads on the interior of the member engaging threads on the cross-head 61. It is desirable to prevent any relative turning of the piston 51 and the sliding member 24 so as to preserve accurate adjustment and this is effected by a screw 71 extending through the wall of the sliding member 24 and into the cross-head 61.

The springs for throwing open the hooks 56 and 57 when the arms 59 are clear of the end of the shell or casing 23 and the pull of the load is relieved, are composed of spring wire. One of them is shown in detail in Fig. 9. It consists of a straight portion 72 cooperating with the collar 55 (Figs. 1, 2 and 3) and a laterally bent portion 73 extending through a hole in the body of the hook and a parallel portion 74 engaging through another hole in the body of the hook, the effect being to connect one end of the spring rigidly to the hook. When all of the parts are in their innermost positions as shown in Fig. 2 the portions 72 of these springs are untensioned or straight and in contact with the lower surface of the sleeve 55. As the hooks are drawn outward they first have an idle movement relative to the rest of the mechanism permitted by the slots 58. This idle movement results in a progressive flexing of the springs as illustrated in dotted outlines in Fig. 4 so that by the time the pull on the hooks begins to move the sliding member 24 to actuate the piston 51 the springs will be in a fully flexed or tensioned condition. One of the springs as it appears when fully tensioned is shown in full lines at 72a in Fig. 4.

With the springs tensioned, their tendency is to spread the hooks 56 and 57 apart, but such action is prevented—even though the arms 59 are clear of the casing 23 when the piston 51 has completed its desired stroke—by the downward force of the load. However, when the load strikes the ground, the springs become effective to open the hooks to the positions in which they are shown in Fig. 3 and the parachute load ring 21 will thereupon be set free to disconnect the parachute or attached load—it being understood that the illustrated unit may be rigged between any opposing forces or may be anchored to stay with a parachute and release the attached load. It should be stated here that the arms 59 are so constructed that their upper edges 75 will serve as guides to prevent the load ring from accidental re-engagement with either of the hooks.

Fig. 12 shows another form of expansion device for the head of the dash pot cylinder 36, such device comprising a sealed bellows or Sylphon 80, entirely evacuated of liquid. The Sylphon may be sealed under atmospheric or subatmospheric pressure, or it may be charged with compressed air to retard expansion of the liquid or to produce a desired degree of pneumatic pressure in the liquid. When charged with compressed air, the Sylphon will pulsate with alternate expansion and contraction of the liquid in the piston cylinder, thereby preventing formation of any void or formation of a gas pocket over the liquid and assuring that the cylinder is full of liquid under all temperature changes.

It should be noted that the valving action of the ball valve 66 causes a vacuum effect in the cylinder cavity 38 in the event that the piston should tend to move in a reverse direction, e. g. should tend to be drawn by gravity out of the cylinder when the load just becomes slack. Such vacuum effect tends to keep the piston in the position of Fig. 3, and thus to keep the legs 59 of the hooks from falling back into the casing before the springs force them apart.

The arrangement of Figs. 13, 14 and 15 embodies many parts and features which are essentially the same as in Figs. 1-3 and are therefore similarly identified without further description, and may include further features omitted from these views for simplicity of illustration; a principal difference is in the hooks, which are here arranged in a group of three, comprising a pair of identical outer hooks 81 engaging the ring 21 from one side and a cooperating inner hook 82 interleaved between the outer pair and engaging the ring from the other side. The general configuration of these hooks is otherwise similar to that of the hooks 56, 57, including legs 83 to be held by the casing 23, all with like advantage; but no springs are employed, and the hooks are simply pivoted on the pin or shaft 84 without the slots of Figs. 1–3. Furthermore, the ring-engaging parts of the hooks 56, 57 are of a "clinch" type, with downwardly turned fingers requiring some actual displacement of the ring 21 toward the rod 54—when the load strikes the ground, or at least then as a result of the spring action—in order to release the hooks; in contrast, the inner contour of each of the hooks 81, 82 is substantially circular, with a radius slightly larger than that of the embraced part of the ring 21, and terminates at least at a central vertical line without appreciably overlapping the ring at the region of contact.

Specifically, the hooks 81, 82 are adapted to spread apart and release the ring, of their own accord, as soon as they are pulled fully out of the casing 23. Thus the apparatus of Figs. 13 to 15 is adapted for release of the load in flight, or while it is descending, such release being effectuated at a predetermined desired time after initiation of descent, under control of the timing means constituted by the dash pot and the piston 43.

In Figs. 13–15, the diaphragm 86 to be sheared by the cutting die face 87 of the piston 43 has its upstanding flange 88 held between an inner, concentric sleeve 89 and an enlarged or expanded portion 90 of an outer concentric sleeve 91, the several sleeves being retained in cooperating recessed portions of the mutually threaded cylindrical members 92, 93. When the latter are tightened together, the lower edge of sleeve 89 forces the diaphragm against a shoulder of the sleeve 91, as shown, so that the parts are sealed and locked, in good alignment.

The shearing face 87 (see Figs. 14 and 16) of the piston here has a central land or raised portion 93 extending across it, and the adjoining portions of the face taper from the level of the portion 93 in opposite directions as shown. This configuration is particularly advantageous in producing such distortion or other non-planar disposition of the ultimately sheared disc (from the diaphragm) as to keep the latter from valving off the discharge of liquid through the central aperture 94 of the piston.

It is to be understood that the invention is not limited to the specific apparatus herein shown or described but may be embodied in other forms without departure from its spirit as defined by the following claims.

What is claimed is:

1. A device of the character described comprising means at one end to which a load may be attached and means at the other end manually operable to connect the device to a suspending instrumentality, said means being relatively movable when said instrumentality assumes support of the load, a fluid chamber on the interior of the device, a diaphragm sealing said chamber, a die for cutting said diaphragm, a carrier for said die actuated by one of the aforesaid relatively movable means to cut the diaphragm to unseal the fluid chamber, said die having a vent through which the fluid escapes during further movement of the die and its carrier, and means controlled by said die and carrier for conditioning the manually connected means to permit disconnection of the load from the suspending instrumentality, said relatively movable means respectively including structures at opposite ends of the device for connection to the load and the supply instrumentality, and said die carrier including means which is disposed externally of the chamber and extends around the same for operative connection with that one of the movable means which actuates the die.

2. A device according to claim 1 in which the die has a peripheral shearing edge to shear the diaphragm around said periphery and also includes a raised cutting edge disposed on the face of the die and intersecting said peripheral edge to effect a rupture of the diaphragm within the area bounded by said periphery.

3. A device of the character described comprising a tubular casing, a member held in a fixed relation to said casing constructed to provide a cylindrical interior, a diaphragm across said interior for holding fluid in the upper part of said interior, a piston normally in the lower part of said interior, a die on said piston constructed to cut the diaphragm by an initial movement of the piston, a valve in the die for the escape of fluid during continued further movement of the piston, means for connecting the device at one end to a load and sister hooks at the other end operable to connect the device to a suspending instrumentality, connections to the sister hooks for actuating the piston when said instrumentality assumes support of the load, said connections extending from the piston around outside the member which provides a cylindrical interior and connecting with the sister hooks at the opposite end of the said member, means to hold the sister hooks against opening and means controlled by the valve in the die for releasing the sister hooks from the last-mentioned means.

4. A device for connecting a suspending instrumentality and a load comprising a casing, means for connecting a load to said casing, a member supported for sliding movement in and out of the casing, hooks on the outer end of said member movable to engage them with the load ring of said instrumentality, arms rigid with the hooks cooperating with the interior of the casing for holding the hooks engaged with said load ring when the sliding member is in an innermost position, a piston actuated by the sliding member, a cylinder cooperating with the piston, a diaphragm across the cylinder supporting a charge of fluid in the upper part of the cylinder, and providing an integrally complete seal for the cylinder, an expansion chamber in the cylinder above the level of the fluid, metallic means yieldingly excluding fluid from said chamber, a die on the piston head for shearing the diaphragm as the piston is forced into the cylinder by outward movement of the sliding member when the load is imposed on the load ring, a valve in the die and piston for escape of fluid from above the die as the piston moves into the cylinder whereby to retard movement of the sliding member outward far enough for the aforesaid arms to clear the casing, said cylinder being connected to the casing, and said sliding member including means extending from the piston up outside the cylinder to the hooks so that when said outward movement of the sliding member occurs the piston is moved against the diaphragm to shear the same, and on into the cylinder.

5. A device of the character described comprising a tubular casing, means for attaching a load to one end of said casing, a member having a limited sliding movement in and out of said casing, hooks on the outer end of said member manually operable to engage them with the load ring of a suspending instrumentality, arms rigid with the hooks cooperating with the interior of the casing to hold the hooks in engagement with the load ring when the sliding member is in an innermost position relative to the casing, a piston carried by the sliding member, a piston cylinder rigid with the casing, a diaphragm extending across the bore of the cylinder and immovably sealed at all its edges and retaining a desired volume of fluid in the cylinder above the piston, a die on the piston head constructed to shear the diaphragm during upward movement of the piston, and a valved vent through the die and piston for escape of fluid from the cylinder during upward movement of the piston after the diaphragm has been sheared whereby to control the rate of the outward movement of the sliding member, said sliding member being adapted to be drawn outward far enough to carry the aforesaid arms clear of the casing, and said sliding member extending from the piston up outside the cylinder to the hooks so that when the casing and hooks are pulled relative to each other the die is forced into shearing relation to the diaphragm.

6. A device for connecting and disconnecting a suspending instrumentality and a load comprising a piston, means movable to actuate said piston, hooks on said means manually engageable with a load ring of said suspending instrumentality and means for retaining them in such engagement, a fluid chamber above said piston, a diaphragm sealing said chamber, said piston-actuating means being disposed externally of said sealed chamber, a die on the piston constructed to cut the diaphragm as the piston actuating means is moved outward when the weight of the load is assumed by the load ring, a vent in the die for escape of the fluid from the fluid chamber after the diaphragm is cut to permit further outward movement of the piston, and means controlled by said further movement of the piston for disabling the hook retaining means to free the hooks for disengagement from the load ring.

7. A device of the character described having means at one end to which a load may be connected, a piston, a cylinder for the piston rigid with said means, a piston carrier movable from an inner to an outer position relative to said cylinder to actuate the piston, a fluid chamber in the cylinder above the piston, a diaphragm retaining the fluid in said chamber, said piston carrier being disposed externally of said diaphragm-enclosed fluid chamber, hooks on the outer end of the piston carrier manually engageable with the load ring of a suspending instrumentality, means cooperating with said hooks to maintain said engagement while the piston carrier and piston are in the inner position, a die on the piston for cutting the aforesaid diaphragm during the outward movement of the piston, a vent through the die and piston for restricting the escape of fluid whereby to retard the outward movement of the piston, hook-retaining means controlled by the piston carrier for release of the hooks, and means for spreading the hooks apart to release the load ring upon relief of the load from suspension by the aforesaid instrumentality.

8. A device of the character described having means at one end to which a load may be connected, a piston, a cylinder for the piston rigid with said means, a piston carrier movable from an inner to an outer position relative to said cylinder to actuate the piston, a fluid chamber in the cylinder above the piston, a diaphragm retaining the fluid in said chamber, hooks on the outer end of the piston carrier manually engageable with the load ring of a suspending instrumentality, means cooperating with said hooks to maintain said engagement while the piston carrier and piston are in the inner position, a die on the piston for cutting the aforesaid diaphragm during the outward movement of the piston, a vent through the die and piston for restricting the escape of fluid whereby to retard the outward movement of the piston, hook-retaining means controlled by the piston carrier for release of the hooks, and means for spreading the hooks apart to release the load ring upon relief of the load from suspension by the aforesaid instrumentality, said means for spreading the hooks apart including tensioned springs, said hook-retaining means being adapted to be released near the end of the outward movement of the piston carrier, said hooks being mounted for limited movement relative to the piston carrier, and said springs being disposed to be tensioned by an initial movement of the hooks relative to the piston carrier before the carrier is moved.

9. A device for connecting and disconnecting a suspending instrumentality and a load comprising a casing, means at one end of the casing to which the load may be attached, a member supported for sliding movement in and out of the other end of the casing, hooks constructed to provide slots surrounding a pivot pin on the outer end of the sliding member and manually operable to engage them with the load ring of said instrumentality, arms rigid with the hooks cooperating with the interior of the casing to hold the hooks in engagement with the ring when the sliding member is in its inner position, said arms remaining in the casing during a preliminary outward movement of the hooks relative to the sliding member to an extent permitted by the aforesaid slots and pivot pin, springs connected to the hooks and means cooperating with said springs whereby the springs are tensioned by said preliminary movement, said sliding member being adapted to be moved out far enough by weight of the load on the hooks for the aforesaid arms to clear the casing, and said tensioned springs being adapted to disengage the hooks upon relief of the load from suspension by the aforesaid instrumentality.

10. A device for connecting and automatically disconnecting a suspending instrumentality and its load comprising a casing, a member at one end of the casing to which a load may be attached, a member normally within the casing supported for sliding movement outward of the casing, hooks on the outer end of said member, arms rigid with the hooks, said hooks being normally held in engagement with the load ring of the suspending instrumentality by cooperation of said arms with the interior of the casing, means for retarding outward movement of the sliding member comprising a hydraulic cylinder and a piston moving with the sliding member, a diaphragm for sealing the hydraulic fluid in the cylinder above the piston, means extending below the piston and externally of the aforesaid sealed fluid-containing portion of the cylinder, for connecting the piston to move with the sliding member, an expansion chamber above the level of the hydraulic fluid, a metallic member excluding the fluid from said chamber constructed to yield under pressure due to expansion of the fluid, a die on the piston for shearing the diaphragm as the piston moves into the cylinder, said die being constructed to restrict the escape of fluid past the die and piston during said inward movement of the piston until the arms on the load hooks are free of the casing.

11. A device according to claim 10 in which the yielding metallic member excluding the hydraulic fluid from the expansion chamber is a hermetically sealed Sylphon containing air.

12. A device according to claim 10 in which the yielding metallic member in the expansion chamber comprises a snap diaphragm attached at its edge to the wall of the chamber.

13. In a device of the character edscribed, means including gripping members for connecting a load to a suspending instrumentality, and a piston and cylinder relatively movable in response to support of the load by said instrumentality, means for holding said gripping members in engaged position, said means being disposed to be controlled by said piston and cylinder, for release upon predetermined relative displacement of the latter, said cylinder containing liquid to retard movement of the piston, and having a seal to be broken by the piston, passage means for escape of liquid from the cylinder upon relative movement of piston and cylinder, and reservoir means receiving the liquid escaping through said passage means, said passage means comprising an opening through the piston, having an effective size to provide a predetermined retardation, and said reservoir means comprising a chamber carried by the piston.

14. In a device of the character described, means including gripping members for connecting a load to a suspending instrumentality, and a piston and cylinder relatively movable in response to support of the load by said instrumentality, and means for holding said gripping members in engaged position, said means being disposed to be controlled by said piston and cylinder, for release upon predetermined relative displacement of the latter, said cylinder containing liquid to retard movement of the piston, and having a seal to be broken by the piston, said piston comprising a shearing head and said seal comprising a diaphragm having a disc portion and a peripheral flange at an angle to the disc portion and means engaging said diaphragm about said flange to hold the edge of the diaphragm for shearing action of said shearing head on the disc portion, and said device including means disposed externally of the aforesaid sealed liquid-containing portion of the cylinder for operatively connecting the piston and cylinder to the first-mentioned means.

15. In a device of the character described, means including gripping members for connecting a load to a suspending instrumentality, and a piston and cylinder relatively movable in response to support of the load by said instrumentality, means for holding said gripping members in engaged position, said means being disposed to be controlled by said piston and cylinder, for release upon predetermined relative displacement of the latter, said cylinder containing liquid to retard movement of the piston, passage means comprising an opening through the piston, for escape of liquid from the cylinder upon relative movement of piston and cylinder, said passage means having an effective size to provide a predetermined retardation, and reservoir means comprising a chamber carried by the piston, for receiving the liquid escaping through said passage means.

LEONARD P. FRIEDER.
WALTER S. FINKEN.

REFERENCES CITED

The following references are of record in the file of this patent:

UNITED STATES PATENTS

| Number | Name | Date |
| --- | --- | --- |
| 874,150 | Young | Dec. 17, 1907 |
| 1,434,024 | Ree | Oct. 31, 1922 |
| 2,400,165 | Porter | May 14, 1946 |
| 2,425,018 | Williams | 5, 1947 |